United States Patent
Hays et al.

(10) Patent No.: US 10,565,563 B1
(45) Date of Patent: Feb. 18, 2020

(54) SYSTEMS AND METHOD FOR BENEFIT ADMINISTRATION

(71) Applicant: Sprint Communications Company L.P., Overland Park, KS (US)

(72) Inventors: Nathan Hays, Grain Valley, MO (US); Pat Spangler, Adrian, MO (US); Jeff Tinder, Lenexa, KS (US); Ben Travis, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 600 days.

(21) Appl. No.: 14/656,701

(22) Filed: Mar. 12, 2015

(51) Int. Cl.
  *G06Q 10/10* (2012.01)
  *G06F 17/27* (2006.01)
  *G06F 17/24* (2006.01)

(52) U.S. Cl.
  CPC ....... *G06Q 10/1057* (2013.01); *G06F 17/248* (2013.01); *G06F 17/2705* (2013.01)

(58) Field of Classification Search
  CPC .................. G06Q 10/1057; G06F 17/2705
  USPC ......................................................... 705/322
  See application file for complete search history.

(56) References Cited

U.S. PATENT DOCUMENTS

| | | | | |
|---|---|---|---|---|
| 9,659,062 | B1 * | 5/2017 | Kapoor | G06F 16/24561 |
| 2003/0229522 | A1 * | 12/2003 | Thompson | G06Q 10/067 |
| | | | | 705/4 |
| 2004/0138950 | A1 * | 7/2004 | Hyman | G06Q 10/06 |
| | | | | 705/14.1 |
| 2005/0187804 | A1 * | 8/2005 | Clancy | G06Q 40/00 |
| | | | | 705/35 |
| 2006/0064313 | A1 * | 3/2006 | Steinbarth | G06Q 10/10 |
| | | | | 705/322 |
| 2008/0244378 | A1 * | 10/2008 | Chen | G06K 9/00456 |
| | | | | 715/226 |
| 2014/0081652 | A1 * | 3/2014 | Klindworth | G06Q 10/10 |
| | | | | 705/2 |
| 2014/0180714 | A1 * | 6/2014 | Mun | G06Q 40/08 |
| | | | | 705/2 |
| 2014/0280254 | A1 * | 9/2014 | Feichtner | G06K 9/00483 |
| | | | | 707/755 |
| 2014/0289147 | A1 * | 9/2014 | Haff | G06Q 10/1057 |
| | | | | 705/322 |

(Continued)

OTHER PUBLICATIONS

"Explaining Health Care Reform: Medical Loss Ratio (MLR)," Kaiser Family Foundation, [online], Published Feb. 29, 2012, available at: < https://www.kff.org/health-reform/fact-sheet/explaining-health-care-reform-medical-loss-ratio-mlr/ > (Year: 2012).*

(Continued)

*Primary Examiner* — Dennis W Ruhl
*Assistant Examiner* — Richard W. Crandall (57) ABSTRACT

Systems and method discussed herein relate to the receipt and processing of invoices from benefit providers by an employer. The invoices may be received in varying electronic formats and a database may be populated with key fields from the invoices using a plurality of templates and an application. The application may determine historic and predictive cost effectiveness, compare cost effectiveness between and within benefit providers, determine variances in the number of participants covered, allocate funds including credits from benefit providers, and route allocations for approval and payment to the benefit providers.

16 Claims, 3 Drawing Sheets

(56) References Cited

U.S. PATENT DOCUMENTS

2015/0127389 A1* 5/2015 Blackman .............. G06Q 40/08
705/4

OTHER PUBLICATIONS

Cambridge Online Dictionary, "over," available at: <https://dictionary.cambridge.org/dictionary/english/over> (Year: 2019).*

* cited by examiner

SYSTEMS AND METHOD FOR BENEFIT ADMINISTRATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some corporations or other business entities may provide various types of employee benefit programs including health insurance, life insurance and disability insurance to a number of current and former employees. In addition, these business entities may participate in various government programs including COBRA which may lead to the business entity paying into funds or otherwise paying bills including premiums. The responsibility for the management and administration of these systems may fall to the business entity itself or may be contracted out to third parties.

SUMMARY

In an embodiment, a system for electronic management of employee benefit programs comprising: a non-transitory memory; a processor; a plurality of data stores; and an application stored on the non-transitory memory and executable by the processor to: communicate with a plurality of remote servers comprising a life insurance benefits administration server, a disability insurance benefits administration server, a retiree benefits administration server, a long-term disability benefits administration server, an active employee benefits administration server, and a leave of absence benefits administration server, to receive a plurality of benefit program information in a plurality of electronic formats, wherein each server of the plurality of remote servers is associated with a benefit program provider; and parse the plurality of benefit program information received to retrieve key fields associated with benefits based upon a plurality of templates stored in the non-transitory memory, wherein the key fields comprise a benefit program participant status, a benefit program identity, a benefit program provider, a plurality of benefit program payments by a benefit program participant, and a plurality of benefit program payments by an employer. The embodiment further comprising wherein the pluralities of benefit program payments by the benefit program participant and the employer comprise preset payment amounts, and wherein the benefit program participant status comprises an employment status of a current employee, a former employee, or a party associated with the current or the former employee who is eligible for benefit program participation; further wherein the application populates a database on at least one of the plurality of data stores with at least some of the parsed information based on at least one template of the plurality of templates; determines of a ratio of the plurality of benefit program payments made to the benefit provider by a benefit program participant to the plurality of benefit program payments made to the benefit provider by the benefit program participant; determine a cost effectiveness by comparing the determined ratio to a target ratio; adjust, based on the cost effectiveness, at least one of a payment amount of the plurality of benefit program payments made to the benefit provider by the employer and a payment amount of the plurality of benefit program payments made to the benefit provider by the benefit program participant that is different from the preset amount; and output a report comprising the comparison, the adjustment, and an indication as to the determined ratio as compared to the target ratio.

In an embodiment, a method for management of benefit programs comprising: receiving, by an application stored on a non-transitory memory and executable by a processor, from a plurality of remote servers, wherein the plurality of remote servers comprise a life insurance benefits administration server, a disability insurance benefits administration server, a retiree benefits administration server, a long-term disability benefits administration server, an active employee benefits administration server, and a leave of absence benefits administration, a plurality of benefit information in a plurality of different electronic formats from different benefit providers for a plurality of benefit program participants, wherein the plurality of benefit program participants comprise current employees, former employees, and other eligible benefit program participants; and parsing, by an application, stored on a non-transitory memory and executable by a processor, the plurality of benefit program information to retrieve key fields, wherein the key fields comprise a benefit program participant status, a program identity, a benefit program provider identity, a plurality of records of payments by an employer, a plurality of records of payments by a benefit program participant, and wherein the benefit program participant status comprises an employment status of a current employee or a former employee. The embodiment further comprising: populating, by the application, a database stored on the non-transitory memory with at least some of the parsed key fields using at least one template of a plurality of templates stored on the non-transitory memory, wherein each template of the plurality of templates is associated with at least one of a different benefit provider or a program within a benefit provider and configured to enable the application to populate the database; determining, by the application, a ratio of a plurality of payments made by the employer to the benefit provider to a plurality of payments made by the benefit program participant to the benefit provider; determining a first cost effectiveness by comparing the determined ratio to a target ratio; adjusting, by the application, an amount paid by the employer or an amount paid by the benefit program participant based upon the first cost effectiveness; and generating and displaying, by the application, a report in response to at least one of the adjustment or the determination of the first cost effectiveness, wherein the report comprises the adjustment and an indication of whether the first cost effectiveness is at least one of greater than or less a predetermined threshold or within the predetermined range and whether the total numbers differ by less than or greater than the benefit program participant variance predetermined threshold.

In an alternate embodiment, a system for electronic management of benefit programs comprising: a non-transitory memory; a processor; and an application stored on the non-transitory memory and executable by the processor to: receive, from a plurality of remote servers, wherein the plurality of remote servers comprise a life insurance benefits administration server, a disability insurance benefits administration server, a retiree benefits administration server, a long-term disability benefits administration server, an active employee benefits administration server, and a leave of absence benefits administration server. information from a plurality of bills associated with plurality of benefit providers wherein the plurality of bills are received in a plurality of electronic formats for a plurality of benefit program participants, wherein the plurality of benefit program participants comprise current employees, former employees, and other eligible benefit program participants; parse the received information to retrieve a plurality of key fields; and generate an allocation of funds based upon the plurality of key fields parsed from the plurality of bills, wherein the allocation of funds comprises a plurality of links to a plurality of supporting documentation and is generated for a predetermined time period; route the allocation of funds along a billing path, wherein the billing path comprises a plurality of approvals; and receive at least one of an approval or an input from the at least one approver. The embodiment further comprising wherein the application adjusts the allocation of funds in response to receiving the at least one input; routes the allocation of funds to a second approver; and authorizes, in response to receiving at least some of the approvals associated with the billing path, payment to the benefit provider of the allocation of funds.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A corporation or other business entity may offer insurance and/or other benefits to its employees through third parties. In either case, the corporation, for example a telecommunications services provider, may desire to track and analyze the record of payments it makes and/or the comparative financial responsibility of the employer and the benefit program participants in order to determine an account for and manage payments and to determine and/or compare cost effectiveness. This may be done by a self-insured employer. A self-insured employer may be an employer who pays for various benefits offered to eligible participants, as opposed to fully insured employers which may contract third parties to provide and administer (pay for) coverage for the eligible participants. It is understood that not every eligible participant may elect benefit coverage, and that some eligible participants may participate in some but not all of the different types of benefits offered including but not limited to health, dental, vision, life, and disability insurance. The term "benefit provider," as used herein, is used to indicate a party such as Blue Cross/Blue Shield, United Healthcare, or other entity that offers various types of benefit programs which may include health insurance, vision insurance, disability insurance, dental insurance, and other benefits. A company that self-insures is responsible for a portion of insurance payments for claims as well as general program administration, and the participants covered by the benefit programs pay another portion of the claim and general program administration (which may be a paycheck deduction if the participant receives a paycheck).

The term "cost effectiveness" as used herein is a measure employed by a self-insured employer to determine whether a forecasted and/or budgeted-for payment amount or ratio is being met. The cost effectiveness may be represented as, and determined by, using a ratio of payments made by an employer to payments made by a participant or group of participants and comparing that ratio to a predetermined threshold to determine if the threshold is met or exceeded by current benefit provider and program offerings. An employer may have a predetermined range or threshold, e.g., an 80:20 ratio of payments made by the employer and payments made by the benefit program participant, or a ratio range as further discussed below. As used herein, the term "employer" may be used interchangeably with "corporation" or "business entity" or "entity," and it is understood that some participants may no longer be employees of the employer, or in the case of participants covered by the benefits program who were relatives or otherwise covered, the participants may never have been employed by the business entity offering the various benefit programs.

In some embodiments, the cost effectiveness may be used to analyze benefit providers and programs offered by those benefit providers that are offered or that are being considered for offering to benefit program participants. The benefit program participants may have different statuses as current or former employees, or relatives or other parties associated with current or former employees. It is appreciated that the benefit providers may provide a variety of types of benefits including health, life, disability, auto, and other types of insurance or other benefits and that the systems and methods discussed herein may be employed across the aggregation of different types of benefits.

Systems and method disclosed herein relate to improving the way a business entity ("employer") manages the process for selecting and providing benefits to current and former employees by automating the process by which information (bills) from benefit providers is received and analyzed. As used herein, a program carrier or benefit provider ("provider") may be the entity that provides a benefit such as health or life insurance, e.g., Blue Cross/Blue Shield or United Healthcare, the entity that offers the benefit programs and provides the options for the participants to the self-insured employer. The benefit provider may be a private entity or a government agency. Each benefit provider may offer a plurality of programs to potential participants deemed eligible by an employer. Each program may comprise a plurality of options that may impact the cost to the employer as well as the services available to the participants enrolled in the respective programs. In some embodiments, different programs may be offered to current and former employees and to subsets of employees within those groups, such as retired employees, or employees on short or long-term disability.

Conventionally, this process of analyzing records of payments to and reviewing and paying bills from benefit providers may be done manually because of the challenge involved with receiving information from different sources in different formats that may comprise different or overlapping information, or information with varying titles that may make it challenging to automate the process. This conventional process increases the chances for an erroneous entry, presents challenges for allocation and payment, and may not be desirable for the analysis and tracking of company and employee-paid amounts from a plurality of benefit providers, nor reconciling information between the employer and the providers and processing the associated bills from the benefit providers. Cost allocations, which may be referred to herein as "allocations," are the means by which a company spreads out an amount of money owed to a vendor such as a benefit provider. These funds may come from different budget "buckets" including a credit bucket that may comprise the credits discussed herein. An allocation of funds may be made between benefit providers, or among programs within a provider, or in another manner that enables the invoices received from benefit providers to be paid. As is understood in the field of accounting, once allocations are approved, bills (invoices) from benefit providers may be paid by the company.

For example, conventionally, a benefit provider may send the employer information regarding claims from a plurality of benefit program participants over a predetermined time period. This information may then be manually entered into a database or other file in order to determine the amount of money that the employer is to allocate for a particular benefit provider and/or program. This information from the benefit providers may be sent to the employer, who may be a self-insured employer, in various file formats and in various configurations of information within and between file formats. A file format may be a .pdf file, a .doc or .docx file, an .xls or .xlsx file, or other electronic formats that may be referred to herein as "varying electronic formats," "different electronic formats," or as "a plurality of electronic formats" to indicate that some of the plurality of formats may be the same and some may be different. In addition, the content of these files may vary between benefit providers.

Turning back to the conventional method, the manually created file may be shared by email, messaging, or on a shared drive or other server for review and/or comments. This file may be circulated, for example, to correct any errors or so that the approvals needed to allocate and pay various benefit providers can be obtained. The manually created file may have been created without an associated schema of permissions, rules, and restrictions for data entry and/or editing, and may have thereby been subject to data corruption and entry/editing mistakes as well as multiple requests by reviewers/approvers for edits prior to the allocation of funds to benefit providers being approved. Under this largely manual system, there may be a lack of control over the data entry as well as data editing steps, which presents a challenge for the review and analysis of the cost effectiveness and cost tracking of administrative fees and paycheck deductions as well as other activities associated with management of benefits by a self-insured employer.

Using the systems and methods discussed herein, a business entity may engage in the tracking and analysis of benefits management and administration including but not limited to (1) determining the cost and cost effectiveness of program administration for benefits across different employee statuses, benefit providers, and programs within benefit providers, (2) comparing and analyzing benefit provider programs that are currently offered to benefit program participants and those which may be offered to participants in the future in addition to or instead of currently offered programs (predictive modeling and comparison between currently offered and potentially offered plans), and (3) compare and analyze its own records of benefit program participants against a plurality of benefit providers' records to ensure that the employer's coverage records are both accurate and properly communicated to benefit providers (variance determination). In addition, the systems and methods disclosed herein may be used by the employer (4) to approve or reject allocations of funds and resultant payouts to providers using a routing to not only obtain approvals but also to obtain input such as notes, comments, questions, or edits to the allocation of funds. In an embodiment, if a party who receives a routed allocation inputs a note, comment, question, or edit, the routing may go back to the originator or the routing may be completed to obtain all such inputs from the parties associated with the routing prior to the information being sent to the originator or to a party with the authority for and responsibility to address such inputs.

In an embodiment, a plurality of statuses may be used to track benefit program participants. The current employee statuses may comprise full time employees, part time employees, contract employees, employees on short or long-term disability, employees currently working under the protections of legislation or other government programs such as the Family and Medical Leave Act, or other employees located in the United States or abroad. The former employee statuses may comprise retired employees, employees who were laid off or those who are otherwise no longer employed by the corporation. The statuses of participants who were never employees of the business entity (which may be referred to as an "other" status herein) may comprise relatives or other parties that may be covered by a benefit program based upon the laws that govern who may be covered by various benefit programs. The business entity may be a large entity with offices in many different cities, states, and countries, so there may be considerable complexity associated with the company's desire to track and analyze the costs of these benefit programs. In some embodiments, the information may be tracked and analyzed as required by local, state, federal, or other government regulations, as well as for the company's own purposes including ensuring that the programs offered are being used at a level that indicates that the program should continue to be used, determining whether to switch programs within a benefit provider, determining whether to switch benefit providers, determining whether to add or remove options within a program, and in order to predictively model future spending for budgeting and vendor (benefit provider)-selection purposes.

The costs analyzed may be those which were employer-paid and participant-paid, and may include premiums and fees as discussed herein. The business entity may incorporate into its budget a ratio of participant-paid amounts to business entity (employer)-paid amounts. The employer-paid amounts may be related to claims from participants, and the administrative fees paid by the employer may include those premiums in some embodiments, and in other embodiments may be separate from the claims that comprise fees associated with other activities of a benefit provider that may not be tied to claims. In an embodiment, the administrative fees may comprise co-pays independent of claim filings made by the employer, premiums paid by the employer for claim filings, flat fees for coverage, annual general administration fees, reporting fees, and government-mandated fees. In an alternate embodiment, payments made by the business entity for claims filed by benefit program participants may be referred to as employer-paid premiums and may be analyzed separately in order to determine the ratio of payments for claims between a benefit program participant and business entity, for example, between the employee and the company. It is appreciated that the premiums discussed herein may be predetermined and preset by the employer. The participant-paid premiums may comprise the premiums paid by the benefit program participant independent of the claims filed, and may be compared to the provider-paid premiums to determine if a ratio is within a predetermined range or within a predetermined percentage of a target ratio that may have been defined in the business entity's budget.

In some embodiments, the information received from benefit providers (which may be bills/invoices) by an employer may be received in various formats, and each benefit provider may provide different information or information over differing time intervals that is collected and entered by an application as discussed herein. In some embodiments, in order to maintain data integrity, the information may be protected at various stages in the process. For example, the receipt of data, data entry, data editing, and reporting functions as well as other functionalities of the system may be categorized and associated with a plurality of access rights. The access/entry to various pieces of data and the generation of reports based upon this data may be granted based upon a schema of rules and permissions associated with the data and/or user IDs. In an embodiment, the schema of rules and permissions may grant varying levels of access to a data base/data store or resultant report which may include read access, write access, read/write access, administrative access, approver, generate reports, establish templates, and other levels of access which may determine the ability of a user to update (load new data), view, edit (information already in the database), and analyze the data. The systems and methods discussed herein may enable an employer to track, predict, and analyze payments to a benefit provider or multiple benefit providers across different benefit categories, as well as route payments for approval and edits and determine variances in a number of participants covered by the various benefit providers.

Figure 1:
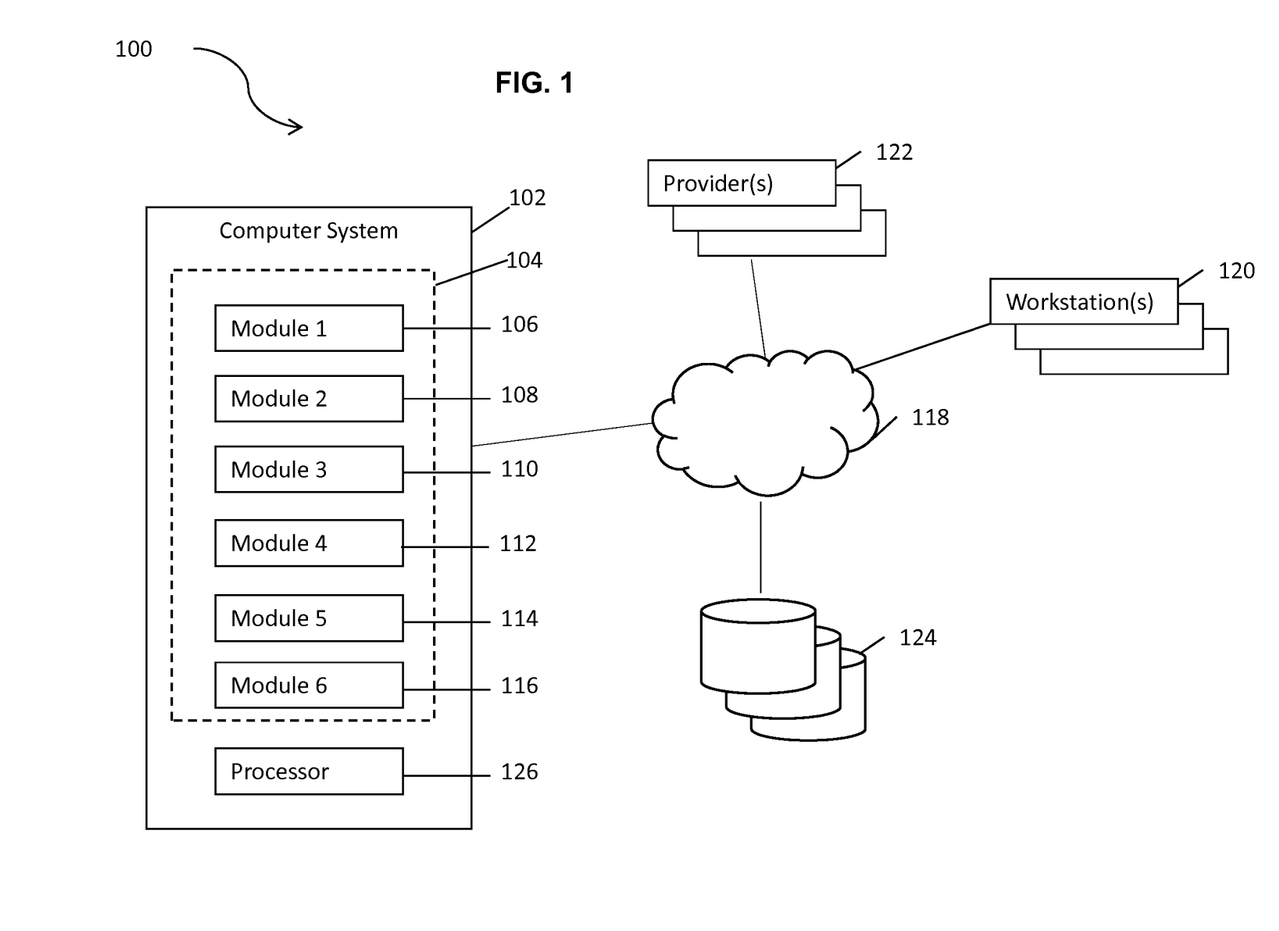
FIG. 1 is an illustration of a system for benefits administration that may be capable of executing according to embodiments of the present disclosure.

FIG. 1 is an illustration of a system 100 that may be capable of executing according to certain embodiments of the present disclosure. FIG. 1 illustrates the system 100 which may comprise a computer system 102 (which may alternatively be referred to as a server 102), a plurality of benefit provider servers 122, a plurality of workstations 120, a network 118, and a plurality of data stores 124. In an embodiment, the server 102 is associated with the company offering the services of the benefit providers to the benefit program participants. The plurality of benefit provider servers 122 may be a plurality of remote servers associated with benefit providers of benefits including life insurance, health insurance, disability insurance, and other employee benefits that may be offered by a self-insured company such as a telecommunications service provider. In alternate embodiments, the plurality of benefit provider servers may comprise a retiree benefits administration server, a long-term disability benefits administration server, a leave of absence benefits administration server, an active employee benefits administration server.

The server 102 may comprise an application 104. The application 104 is configured to communicate with the plurality of benefit provider servers 122 and the plurality of data stores 124 at least to receive information from the benefit providers to use for analysis and/or allocation and payment to the benefit providers, in contrast to the conventional method of manual review and entry of information. In some embodiments, a benefit provider may offer a credit, either an earned credit based upon spending in a particular program, or a credit based upon another customer loyalty metric or incentive program. If a credit is offered, the allocation and billing methods discussed herein may also allocate that credit. In some embodiments, special levels of approval may be used if credits are applied in whole or in part to a single bill or across a plurality of bills. For example, if a $2000 credit is available from benefit provider ABC, a plurality of rules may determine how, when, and across which payments the credit may be used.

Alternatively, the credit may be used by the company to pay the benefit provider across different arrangements of programs or employee statuses and may be allocated in equal portions or in unequal portions across a plurality of invoices from the benefit provider ABC. The allocation process may be complicated because of the number of programs offered and because of the range of benefit program participant statuses and geographic locations, and the systems and method discussed herein may provide the ability to predictively model allocations in order to determine how various allocations may impact the cost effectiveness of a program or benefit provider.

In an embodiment, the employer may be able to automatically populate a database in a data store of the plurality of data stores 124 with information from multiple benefit providers by setting up a plurality of rules and procedures for the intake and analysis of information from the multiple benefit providers. This is in contrast to the conventional method of manual entry of data from a plurality of benefit providers. The systems and methods disclosed herein provide the means for report generation output by an application based upon the information with which the database is populated. This population of the database may be based upon a template for each benefit provider, and/or for each program within a benefit provider, so that when the information is received from the provider it can be entered in a consistent, reliable manner into the system 100, in contrast to the conventional manual entry method.

This information may be reviewed within a single benefit provider, among and between different providers, as well as between programs of a single benefit provider and programs from different benefit providers in order to determine the cost effectiveness of different programs. In addition, the system 100 may provide a method of processing payments to benefit providers and ensure that the number of participants covered by the employer is within a predetermined percentage of the number of participants covered by the benefit providers. This participant number check may be referred to as a variance check, and may comprise an application retrieving a number of enrolled participants from an employer's database or data store and comparing that information with a number of participants enrolled across a plurality of benefit provider programs. A variance report may be desirable for a company to generate and review, especially if that company is rapidly growing, down-sizing, or has had significant changes in employee statuses (expatriates, retirees, etc.) so that the company can ensure that its records correspond within a predetermined range of the records of the benefit providers. Stated differently, the company wants to ensure that it is paying for benefit coverage for the correct type and number of employees and that its records correspond to those of the benefit provider. In some embodiments, the amount a company and/or benefit program participant pays in for claims, administration, or both, may be determined in part on the number of employees covered by a particular benefit provider. This may also provide incentive for an employer to determine the variance on a monthly, quarterly, annual, or other basis.

In an embodiment, reports may be generated for variances in participant numbers between the business entity (employer) and benefit provider, for cost effectiveness, for predictive modeling of cost effectiveness, as well as for routing allocation approvals as well as a report of amounts paid based upon those approvals. In any of these embodiments, the reports generated, or the combination of reports generated, and in the case of an allocation routing for approval, documents associated with the information in the report may be accessed by selecting the various information entries on the report that correspond to the associated documents. This is in contrast to the conventional, manual method where, at best, a group of related documents may be sent by email or other message service to be sorted through individually in order to find support for summarized or otherwise entered information. In addition, the reporting features discussed herein would be challenging, if even possible, to accomplish using the conventional method.

In this example, and as discussed further herein, the application 104 which may be stored on the employer's server may be in communication with the plurality of benefit providers' servers 122 in order to retrieve and analyze the information. The payment processing may be set up with a plurality of billing paths, which may be referred to as review or approval paths or routings, wherein each benefit provider, each program within a benefit provider, and/or each type of benefit may comprise a billing path with various approvals that, when obtained, may result in the allocation and payment of a bill. A billing path may have multiple components, including a peer review and an allocation approval, discussed below. In one example, a billing path may comprise four "stops," which may be individuals or departments, and an originator. The allocation may be routed to each of these individuals or departments for a sequential approval where the allocation is not routed to the second individual or department until it has been reviewed and approved by the first. In an alternate embodiment, the allocation may be sent to all four of the individuals and departments at or near the same time.

If inputs are received from any or all of the stops on the billing path, in either embodiment, the inputs may be routed back to the originator as they are made, or at the end of the routing. Depending upon the inputs and the result of those inputs (e.g., if edits are made to the allocation), the allocation may be re-routed along the same billing path or along a billing path that may comprise different individuals or different departments if the change that was made impacted other departments or necessitated a higher level of approval. A higher level of approval may refer to a situation where an allocation was adjusted or where an edit increased an allocation or an amount owed, and therefore the review/approval of someone in management may be appropriate or required by law or internal policy.

In some embodiments, the payment processing may also include a feedback and editing mechanism that may be associated with the login and editing approval features discussed herein. In this embodiment, the application 104 may route an allocation along a billing path for approval, edits, approval of edits, and may allocate funds and pay the bill once the approvals have been obtained and any edits have been approved. It is appreciated that the same or different approvers may be assigned to approve an allocation on a bill as those assigned to approve edits to an allocation on the bill. An approver may be a specific individual, a department, a title or level of employee, or combinations thereof depending upon the type and amount of a bill. The allocation may be approved by the approvers, and the bill paid based upon the completion of the billing path, or the allocation may be re-routed based upon inputs received during the routing or bill (allocation) generation process which may include a comment, a request for modification, a request directed towards the benefit provider, or a request for at least one of a review or an approval from an approver other than the at least one approver. It is appreciated that the terms "bill" and "allocation" may be used interchangeably herein with respect to the employer paying the provider to indicate a document that lists amounts to be paid to at least one provider, where such amounts and the document are to be approved prior to the benefit provider actually being paid.

In some embodiments, the application 104 may comprise a plurality of modules, for example, module 1 (106), module 2 (108), module 3 (110), module 4 (112), module 5 (114), and module 6 (116). In an embodiment, the modules may comprise an administrative fees module 106, a premium and headcount module 108, a claims module 110, a reporting module 112, a setup module 114, and a back end module 116. In some embodiments, different functions may be performed by some or all of the modules as discussed herein, and various modules may be used in different combinations depending upon the embodiment and may be in communication with servers or server computers associated with remote systems.

In an embodiment, the administrative fees module 106 may track the fees paid to a benefit provider by an employer for the administration of the various benefit programs, the premium and headcount module 108 may track and analyze participant-paid premiums, employer-paid premiums, and may track and analyze the number of participants covered by the benefit providers as compared to the number of participants covered as indicated in the employer's records. These headcounts may be done by benefit provider, by program, by type of benefit, by timeframe for coverage, or combinations thereof, and the reports generated for this analysis may list variances (differences in headcounts between benefit providers and the employer) across benefit providers, programs, type of benefit, and/or timeframe. The claims module 110 may track and analyze the amounts paid by either or both of the participant and the employer, and the reporting module 112 may be employed to generate the various reports associated with the plurality of modules in various combinations and across various time periods. The reporting module 112 may comprise a plurality of options that may be selectable options which may be configured to generate various reports including cost effectiveness analysis, participant variance (count) analysis, predictive modeling, historical analysis of payments by the employer and by participants, and combinations thereof over various reporting timeframes including future dates (forecasting/predictive modeling). The selectable options may include a date range, benefit provider name, type of benefit, timeframe, or other options as available in the system depending upon the type of report desired.

In some embodiments, predictive modeling may be employed based upon quotations from existing or potential benefit providers or using other information provided by benefit providers that allows an employer to compare the financial and service implications of a current benefit provider and/or program to that of a potential benefit provider and/or program or between programs within a benefit provider if the benefit provider, for example, may be introducing new programs in which the employer may consider participating. This may allow an employer to determine not only the cost of various benefit programs and benefit providers in general, and a cost effectiveness, but also to determine future payouts if the current benefit providers and/or programs are offered and to compare different options between benefit providers and programs.

The setup module 114 may be employed to establish and modify the populated database. Each benefit provider or each program within a benefit provider may have a different setup for information received (which may also be referred to as a template) which can be modified, added, deleted, or merged with other setups depending upon what is received from the benefit providers. A plurality of templates may be stored in at least one of the plurality of data stores 124. The templates may be developed in order to enable the application 104 to populate the database in at least one of the plurality of data stores 124 and may be designed to be specific to the manner in which a benefit provider submits billing and invoice information to a company. A template may, for example, enable the application 104 to process bills by interpreting a variety of fields related to claims and other payments made by the participants and due from the employer. This application 104 may populate a database stored in one of the plurality of data stores 124 based upon the appropriate template for information received from a particular benefit provider. By using the templates to populate the database in at least one of the plurality of data stores 124, the correct, consistent types of information may be parsed from each communication from a plurality of benefit providers regardless of the electronic format in which the communication is received or the titles/identifiers associated with different pieces of information.

The back end module 116 may be used to edit information populated in the database in one of the plurality of data stores 124 and, in some embodiments, may be used to route bills and related allocations for approval, comments, editing, and approval in order to pay the benefit providers. In an embodiment, a peer review may be employed that may be a part of or separate from the billing path. A separate peer review path may be established or may be the first part of a billing path where the information in the allocation is reviewed prior to routing for approval (or prior to the approval part of the billing path). This peer review may produce an allocation that is ready for/continues on to the approval part of the billing path or may produce inputs that may lead to additional review and/or revisions of the allocation.

In an embodiment, the application 104 may receive or retrieve a plurality of information from the plurality of benefit provider servers 122. The plurality of benefit provider servers 122 may be associated with a plurality of benefit providers or other associated entities, including government entities. In the example where the application 104 receives information, this information may be sent to the application 104 by the plurality of benefit provider servers 122 on a predetermined schedule, and in the example where the application 104 retrieves information, this information may be retrieved by the application 104 on a predetermined schedule or by a manual request. In some embodiments, the plurality of data stores 124 may be associated with a plurality of access rights including a view access right, an edit access right, and an administrative access right (access to review the views and edits as well as access to view and edit) that may be determined based upon a plurality of rules that may apply to different users of the plurality of workstations 120.

In some embodiments, the application 104 may receive a request for access from a workstation of the plurality of workstations 120 to a data store of the plurality of data stores 124 on the server 102, and the request may comprise a plurality of login information associated with a user ID. The process by which edits to the database on one of the plurality of data stores 124 are tracked and monitored may be referred to as "change management" or a "change management protocol." The plurality of login information may include one or more passwords or other identifiers including biometric identifiers. The application 104 may compare the received plurality of login information with a plurality of login information associated with the user ID and previously stored on the server 102. The previously stored information may have been stored when the user ID was created or during a previous revision to the stored information. Based upon the login information received, the application 104 may grant or deny the request for access, or request additional information. If access is granted based upon the initial and/or additional information provided, the application 104 may receive at least one change to the plurality of information from the user ID to form a revised plurality of information in response to a determination that the received plurality of login information corresponds to the stored plurality of information. In some embodiments, the changes may be stored and tracked and a report may be generated by the application 104 to track the changes made to the database and map the changes made to a user ID.

In some embodiments, the application 104 may parse the plurality of information received from the plurality of benefit provider servers 122 to retrieve key fields based upon a template. In an embodiment, the key fields may comprise benefit program participant status, benefit program, benefit program provider, participant-paid premiums, claim type, claim amount, participant-paid claim amounts, and administrative fees. A participant status may comprise "current employee," "former employee," or "other." In some embodiments, a participant status may further comprise a sub-status, for example, a sub-status of current employee may be full time, part time, contract, short or long-term disability (e.g., an employee who is on short-term or long-term disability leave), a government program status (FMLA or COBRA), or abroad, including expatriates. The former employee sub-statuses may comprise statuses such as retired, laid off, furloughed, or otherwise no longer employed or not currently employed by the corporation. The key field of "program" may indicate a program or programs offered by the "program provider" key field, a program may comprise a plurality of options related to private or government-mandated, supported, or offered programs for benefits including disability insurance, health insurance, dental insurance, life insurance, medical insurance, and other benefits. Programs may have participant-paid premiums (paycheck deductions) for the program itself (benefit program participation) and/or for options (add-ons, increased coverage) or occurrences (claims) under the terms of the program. Programs may also have administrative fees, that is, the fees paid by the employer for the administration of the program by the benefit provider as well as fees paid out for claims. A claim type may comprise a type of a healthcare or other benefit claim, and the claim amount may comprise the total amount of the claim filed with the benefit provider, including both the participant-paid and employer-paid portions of the claim.

The application 104 may populate the database in at least one of the plurality of data stores 124 with information from at least some of the key fields based upon a template and analyze a cost effectiveness of a benefit provider or of a program or programs offered by a benefit provider. The cost effectiveness may be defined as a measure of how much the employer is paying to a benefit provider, or for a particular program offered by a benefit provider, or for a particular type of benefit, as compared to the amount that the participant is paying for the same. The cost effectiveness may be used to determine whether to continue participating in a particular program (e.g., offering that program to current/former employees), whether to continue business with a particular benefit provider, to compare benefit providers, to compare programs within and between benefit providers, and for other business decisions.

The cost effectiveness may be defined in different ways. In one embodiment, the cost effectiveness may be defined by a predetermined threshold, for example, a ratio of business entity-paid premiums to participant-paid premiums; as a ratio of administrative fees to participant-paid premiums; as a ratio of business entity participant-paid claim amounts to business entity-paid claim amounts; or combinations thereof wherein the ratio used represents the previously defined budgeted amount for the ratio along with the previously defined categories for measurement. That is, the entity may define a ratio that establishes a target or maximum/minimum, or a range of ratios that establishes a target range for the entity to pay as compared to what the benefit program participants pay. In one example, an employer may desire to have a ratio of 80:20. In alternate embodiments, the ratio may be 90:10 or 70:30 or other ratios as determined by the employer. If an analysis of the cost effectiveness determines that this predetermined threshold is not met, or is exceeded, the business entity can use the reporting module to determine the root cause and may adjust benefit provider and program offerings accordingly. In an embodiment, this adjustment may be based upon predictive modeling as discussed herein.

In an embodiment, the predetermined threshold may be a ratio set at 80:20, with the employer seeking to pay 80% of the costs as compared to the employee's payment of 20% of the costs. These costs may include payment for claims (payment for specific services), fee payments (payments that may not be associated with specific services where claims are filed, including payments such as administrative fees and paycheck deductions), or combinations of payments from the business entity and benefit program participant as discussed herein. If it is determined that this number is met by existing programs, management may choose to make no changes to the programs or benefit providers offering those programs. In alternate embodiments, management may decide to offer additional benefits at the same or reduced cost for the following year, i.e., the amount benefit program participant may remain the same or be decreased. If it is determined that the predetermined threshold is not met by existing programs, that is, that the employer is paying more than its percentage of the predetermined ratio, the employer may elect to look for a different benefit provider or a different program under the same benefit provider, or may increase the amount paid by the benefit program participants. For example, if an employer set a predetermined threshold of 80:20, where 80% of costs and claims are paid by the employer and 20% are paid by the participant, the current program offerings and participant payments may be said to be cost effective if the ratio between what the employer and the participant pay is 80:20, or below 80:20, e.g., 70:30, 60:40. If the ratio is instead greater than 80:20, e.g., 85:15, 90:10, etc., the current program offerings and participant payments may be said to not be cost effective. Management may adjust program offerings, benefit providers, or benefit program participant co-pays or paycheck deductions depending upon whether an analysis of payments over a time period indicates that the current program offerings and participant payments are cost effective. This evaluation of cost effectiveness may be done on an annual basis, or periodically during a calendar year. In an embodiment, a paycheck deduction or other participant co-pay (for participants who are not currently receiving a pay check from the employer) may be set on an annual basis. If an employer monitors the cost effectiveness on a periodic or on a dynamic basis, it may be in a better position to set the participant co-pays for the following year or other time period. In an embodiment, the reporting module 112 may output reports comprising flagged areas that may indicate areas of potential savings, existing savings, or areas where spending is over a target or beyond a range.

The systems and method disclosed herein allow for this report generation and subsequent review for information received in a plurality of electronic formats, across different benefit types, different benefit providers, over a varying timeframe, and allow for the communication of the business entity's systems with those of a plurality of benefit providers' systems. In addition, the application 104 may provide analysis of previous years' data so that the overall increase or decrease in benefit cost can be analyzed ahead of the time when renewal decisions are made. This allows management to adjust the amount paid by participants (paycheck deductions and/or claims payment), the amount paid by the employer (administrative fees and/or claims payment), and to investigate new benefit providers or programs as well as the time to negotiate with existing (current) benefit providers. In addition, the application 104 may allocate credits and other funds for payment of invoices from benefit providers by the employer. This process may include billing paths as discussed herein where allocations are routed for approval prior to payment. In this embodiment, a plurality of workstations 120 may be used by approvers and/or an originator who may also edit the allocations based upon feedback from the approvers. The approvers may approve an allocation, approve and comment on an allocation, decline to approve the allocation, or decline to approve the allocation and make a comment. The comments may be reviewed by the originator who may either edit the allocations and re-route along the billing path, make the payment (i.e., if the allocations are approved but comments are made that may relate to future allocations or other matters that would not delay payment due to re-routing, edit and make the payment (i.e., if the comments are related to typos or other issues that may not result in re-routing).

Figure 2:
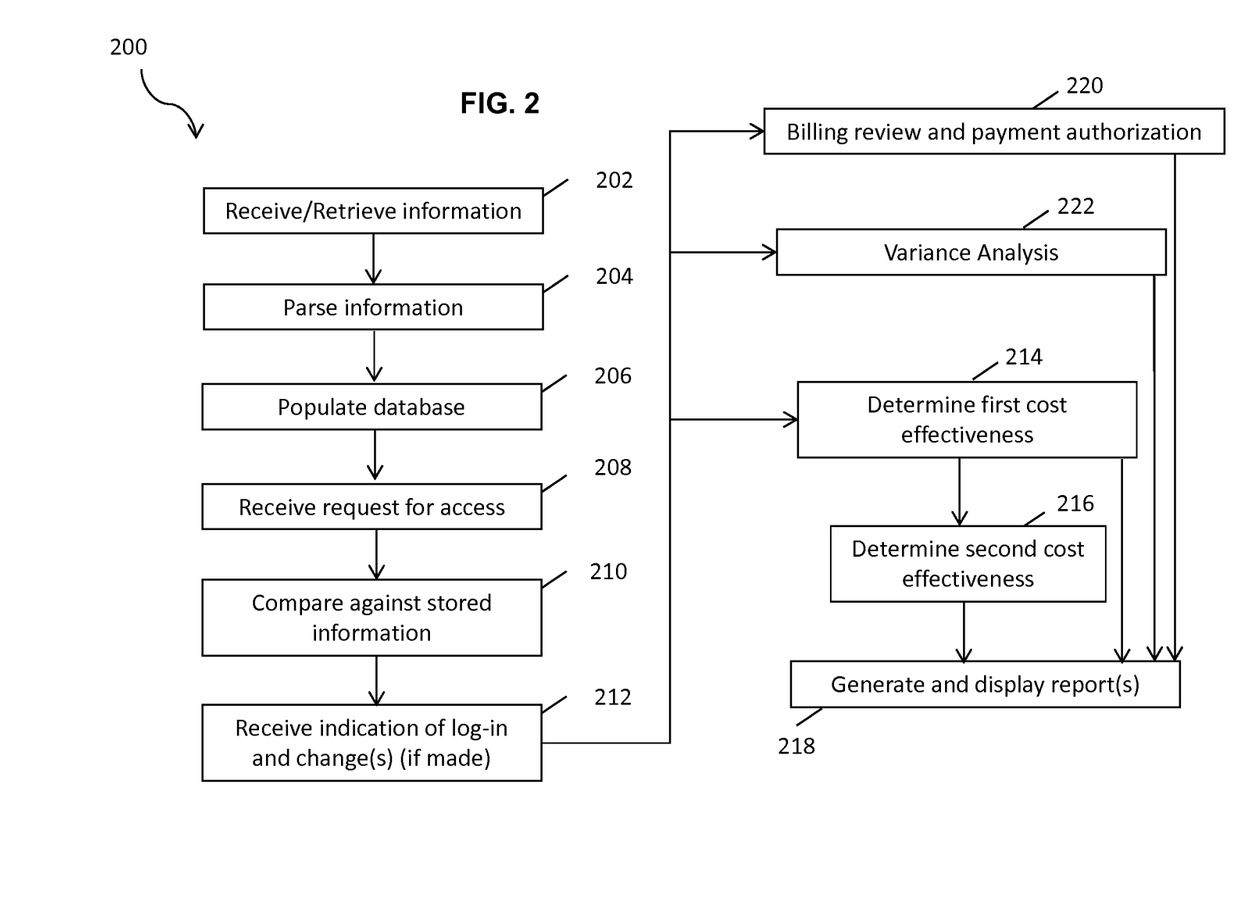
FIG. 2 is a flow chart of a method of benefit administration according to embodiments of the present disclosure.

FIG. 2 is a flow chart of a method 200 of benefits administration by a business entity. In method 200, at block 202, a plurality of information may be received by an application such as application 104. The plurality of information received at block 202 may be received by the application 104 in response to a push from a remote server, or may be retrieved by the application 104 on a predetermined schedule or in response to a manual request. The plurality of information may comprise benefit information for current and former employees or other covered parties (e.g., relatives) who may be referred to as "benefit program participants," "program participants," or "participants." This plurality of information may comprise what payments were made by the benefit program participants and what payments were made by the business entity (employer) across a plurality of benefit providers and benefit programs within those benefit providers. While the benefit program participant-paid premiums may be referred to herein as paycheck deductions, it is understood that, for example in the case of former employees who may retain some or all of their benefits under the provisions of COBRA, the payments may be made in a manner other than a paycheck deduction. This information may be received at block 202 in a plurality of different electronic formats and may be arranged in different configurations that previously made the conventional manual data entry challenging and error-prone.

In an embodiment, at block 204, the application 104 may parse the plurality of information to retrieve key fields, wherein the key fields comprise benefit program participant status, program, program provider, participant-paid premium, and administrative fees. This information may be parsed based upon a plurality of templates that are configured to enable an application to extract information from a plurality of benefit providers in order to analyze, compare, and contrast the parsed information. Each template may define a plurality of rules that may be specific to, for example, a particular benefit provider, program offered by a benefit provider, an employee status, a benefit type, a government program, or combinations thereof. The templates are employed in order to enable the application (for example, the application 104 in FIG. 1) to extract information from a plurality of benefit providers' bills/invoices that may differ not only in electronic format but also in the naming or quantification of data provided. The templates take into account these differences and enable the parsing and population of information in the database by the application 104 in a manner which promotes further analysis and reporting, including allocation of funds, allocation approvals, and payments to benefit providers.

At block 206, a database may be populated automatically with at least some of the information from the key fields. The database population at block 206 may be based upon the plurality of templates. The populated information may be editable as discussed herein. In some embodiments, the database administrator or management may not desire to provide unrestricted access to the database. In this embodiment, at block 208, the application 104 may receive a request for access comprising a plurality of login information associated with a user ID. This request for access at block 208 may come from a workstation of the plurality of workstations 120 shown in FIG. 1. The application 104 may, at block 210, compare the received plurality of login information with a plurality of login information associated with the user ID and previously stored on the non-transitory memory. At block 212, the application 104 may receive an indication of a log-in by the requestor's user ID and may receive at least one change to the plurality of benefit program information from the user ID to form a revised plurality of benefit program information in response to a determination that the received plurality of login information corresponds to the stored plurality of benefit program information.

In an embodiment, the analysis performed by the application 104 including the plurality of modules may be employed to determine a cost effectiveness of a program and/or determine how to budget for employee benefits in the future across a wide, and in some cases complete, cross-section of current and former employees. As used herein, a "complete" cross-section comprises a group that includes current and former employees and benefit program participants who may not have been employees but are otherwise eligible to participate in benefit programs (i.e., relatives of current and former employees). The "complete" cross-section may further comprise participants who receive benefits offered by the federal, state, local, or other government entity including military programs to which the employer may elect or may be required by law to contribute. In that embodiment, the application 104 at block 214 may analyze a first cost effectiveness of a plurality of payments comprising payments made to a benefit provider by the benefit program participant and a plurality of payments made to the benefit provider by the employer. The analysis of the first cost effectiveness may be determined by the plurality of payments made to a provider by the benefit program participant and the plurality of payments made to the provider by the employer, and may be determined by benefit provider or by a program within a benefit provider. These pluralities of payments may comprise the fees paid by each party (employer and benefit program participant), and/or the claims amount paid by each party. This data may be compared against a predetermined threshold which may be a ratio (payments by employer: payments by the benefit program participant) or may be a maximum, minimum, or range (of percentages or ratios) of payments made over a specific time period. The time period for this analysis may be selected in order to review both the short-term allocations as well as the history of payments to a benefit provider or under a specific benefit provider's program, for predictive modeling purposes, as well as for comparison purposes between existing and potentially offered providers and programs as discussed below.

In some embodiments, a second determination at block 216 may be made which may be a determination of a second cost effectiveness. This determination at block 216 may comprise an analysis of the plurality of payments made to a benefit provider by the benefit program participant and the plurality of payments made to the benefit provider by the employer for a different benefit provider and/or a different program under the same benefit provider used for the determination of the first cost effectiveness at block 214. This information may be analyzed in a similar fashion to block 214 where the information analyzed is compared to a predetermined threshold.

At block 218, a report may be generated and displayed by a reporting module, the report may comprise at least one of a comparison of information against the target/predetermined range or target ratio (i.e., the cost effectiveness), and in alternate embodiments the report may additionally or alternatively comprise a comparison of payments associated with of two benefit providers, two programs within a benefit provider, two programs from different benefit providers, two different benefit providers, or more than two programs or benefit providers. Two different benefit providers may be compared without the comparison of specific programs within a provider if, for example, a provider only gives one option for a particular benefit, or if a type of payment such as an annual (or other time frame-based, participant number-based, or other high-level payment that may not be specific to claims) administration fee is applied equally to all programs under a benefit provider. In another example, two different benefit providers may be compared if a benefit provider's fee schedule is based upon a number of enrolled employees, a term of enrolled employees, a term of employer participation, or in other cases where there are fees paid to the provider by the employer and/or the benefit program participant that may be standard across all programs offered by that benefit provider.

In alternate embodiments, a report may be generated and displayed at block 218 that reflects a variance analysis performed at block 222. This variance analysis may compare a total number of benefit program participants from the employer's database with a total number of benefit program participants from at least one benefit provider's database or data store, where each number of benefit program participants reflects the number of individuals covered by a benefit program. This comparison may be performed by the application and analyzed against a predetermined threshold. For example, if a variance threshold is set to 5%, then an analysis that results in a benefit provider reporting a number of benefit program participants either greater than 5% or less than 5% of the number of benefit program participants indicated by the employer's database may cause a notification to be sent to the employer to flag this variance. In alternate embodiments, the variance threshold may be set higher or lower than 5%, and in a preferred embodiment the variance threshold may be set to about 2%.

In an alternate embodiment, at block 220, the system provides a mechanism for billing review and payment authorization. Each benefit provider sends billing information that may be received or retrieved by the application at block 202 as discussed above, and each benefit provider may be associated with at least one billing path. The billing path may comprise a plurality of rules and related approvals that may specify which individuals or level/title of employee is authorized to sign off on a benefit provider's bill in order to trigger a payment. In contrast with the conventional method of a series of emails and related attachments, the system discussed herein allows for a plurality of rules for peer review and approval to be set for each benefit provider or for plans within a particular benefit provider. In alternate embodiments, different types of benefits (healthcare, life insurance, car insurance, etc.) may have billing paths associated with the type of benefit that may or may not also be associated with a particular benefit provider. A bill may be routed to a first approver, and then routed to a second approver regardless of whether the first approver approves the bill or provides input, and some allocations may take place if fewer than all of the listed approvers sign off, depending upon the plurality of rules and related approvals associated with a particular billing path.

In an embodiment, benefit provider A submits a bill to the employer, the database is populated with the information according to a template associated with either provider A or the particular program, and an allocation is generated for peer review and/or approval. In this embodiment, at least a first party associated with the plurality of rules is notified that there is a bill ready for their review and approval. The first party may then review the documentation using a link sent by email, text messaging, short message service, or other methods of notification and either approve the bill and/or submit comments/requests for revisions or additional information. This documentation may also be available for review in reports such as reports for cost effectiveness analysis and variances. If the first party approves the bill, a second party may be notified if additional approvals are needed and the method may proceed until the billing path is complete, at which point the approvals may be sent to an accounting department or other entity which will pay the bill. In other embodiments, comments or changes may be input during peer review or during the allocation approval routing of the billing path that may cause further review or revisions to the allocation. In that event, the revised/reviewed/reviewed and revised allocation is re-routed for approval. Upon completing the approvals on the billing path and having addressed the inputs from peer review and/or the approvers of the allocation, the provider's bill may be paid.

Figure 3:
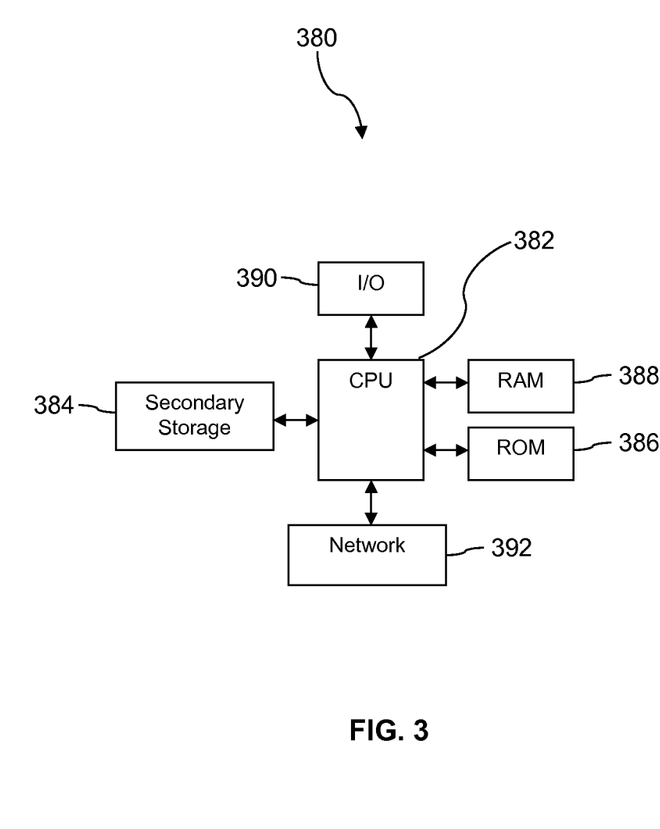
FIG. 3 illustrates a computer system that may be employed for implementation of embodiments of the present disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for electronic management of employee benefit programs comprising:
    a non-transitory memory comprising a template for each benefit program provider of a plurality of benefit program providers, wherein each template of a plurality of templates comprises one or more extraction, parsing, and database populating rules for correct and consistent information extraction, parsing, and database populating for processing information from a corresponding benefit program provider received in an electronic format selected from a group consisting of .doc, .docx, .xls, .xlsx, or .pdf;
    a processor;
    a plurality of data stores; and
    an application stored on the non-transitory memory and executable by the processor to:
        receive a plurality of benefit program information in a plurality of different electronic formats from a plurality of remote servers comprising a life insurance benefits administration server, a disability insurance benefits administration server, a retiree benefits administration server, a long-term disability benefits administration server, an active employee benefits administration server, and a leave of absence benefits administration server;
        parse, using a corresponding template, each benefit program information of the plurality of benefit program information received according to the rules for correct and consistent information extraction, parsing, and database populating of the corresponding template to retrieve key fields associated with benefits regardless of the electronic format selected from the group consisting of .doc, .docx, .xls, .xlsx, or .pdf,
            wherein the key fields comprise a benefit program participant status, a benefit program identity, a benefit program provider, a plurality of benefit program payments by a benefit program participant, and a plurality of benefit program payments by an employer,
            wherein the pluralities of benefit program payments by the benefit program participant and the employer comprise preset payment amounts, and
            wherein the benefit program participant status comprises an employment status of a current employee, a former employee, or a party associated with the current or the former employee who is eligible for benefit program participation;
        for each of the parsed benefit program information, populate a database on at least one of the plurality of data stores with at least some of the parsed benefit program information according to the corresponding template;
        determine a ratio of the plurality of benefit program payments made to the benefit program provider by the employer to the plurality of benefit program payments made to the benefit program provider by a benefit program participant;
        determine a cost effectiveness by comparing the determined ratio to a target ratio;
        adjust, based on the cost effectiveness, at least one of a payment amount of the plurality of benefit program payments made to the benefit program provider by the employer and a payment amount of the plurality of benefit program payments made to the benefit program provider by the benefit program participant that is different from the preset amount;
        compare a benefit program from one of the plurality of benefit program providers currently provided to benefit program participants to a prospective benefit program under consideration for future provision to the benefit program participants based on the determined cost effectiveness;
        compare internally maintained records for the benefit program participants to records for the benefit program participants maintained by at least some of the benefit program providers; and
        output a report comprising the comparison, the adjustment, an indication as to the determined ratio as compared to the target ratio, a result of the comparison between the benefit program and the prospective benefit program, and a result of the comparison between the internally maintained records for the benefit program participants and the records for the benefit program participants maintained by at least some of the benefit program providers.

2. The system of claim 1, wherein the benefit program participant status further comprises a sub-status, wherein the sub-status of a current employee comprises at least one of full time, part time, contract, short or long-term disability, or expatriate, and wherein the sub-state of a former employee comprises at least one of retired, laid off, furloughed, or terminated.

3. The system of claim 1, wherein the plurality of payments by the employer comprises premiums payments, claims payments, and administrative fees.

4. The system of claim 1, wherein the plurality of payments by the benefit program participant comprises premiums payments and claims payments.

5. The system of claim 1, further comprising the application establishing at least one of access restrictions, access tracking, and change management protocols for the database.

6. The system of claim 5, wherein the access restrictions comprise a plurality of rules for access for a plurality of user IDs, wherein the access tracking comprises recording requests for access to and access of the database, and wherein the change management protocols are associated with the plurality of user IDs.

7. The system of claim 1, wherein the plurality of payments further comprises a plurality of payments to at least two programs of the benefit program provider.

8. The system of claim 1, wherein the report comprises a plurality of links to a plurality of supporting documentation associated with the plurality of payments, and wherein at least some of the plurality of supporting documentation comprises invoices from the plurality of benefit program providers.

9. A method for management of benefit programs comprising:
storing a template for each benefit program provider of a plurality of benefit program providers in a non-transitory memory, wherein each template of a plurality of templates comprises one or more extraction, parsing, and database populating rules for correct and consistent information extraction, parsing, and database populating for processing information from a corresponding benefit program provider received in an electronic format selected from a group consisting of .doc, .docx, .xls, .xlsx, or .pdf;
receiving, by an application stored on a non-transitory memory and executable by a processor, a plurality of benefit program information in a plurality of different electronic formats from a plurality of remote servers comprising a life insurance benefits administration server, a disability insurance benefits administration server, a retiree benefits administration server, a long-term disability benefits administration server, an active employee benefits administration server, and a leave of absence benefits administration server;
parsing, by the application, using a corresponding template, each benefit program information of the plurality of benefit program information according to the rules for correct and consistent information extraction, parsing, and database populating of the corresponding template to retrieve key fields regardless of the electronic format selected from the group consisting of .doc, .docx, .xls, .xlsx, or .pdf, wherein the key fields comprise a benefit program participant status, a program identity, a benefit program provider identity, a plurality of records of payments by an employer, and a plurality of records of payments by a benefit program participant, and wherein the benefit program participant status comprises an employment status of a current employee or a former employee;
for each of the parsed benefit program information, populating, by the application, a database stored on the non-transitory memory with at least some of the parsed benefit program information according to the corresponding template;
determining, by the application, a ratio of a plurality of payments made by an employer to the benefit program provider to a plurality of payments made by a benefit program participant to the benefit program provider;
determining, by the application, a first cost effectiveness by comparing the determined ratio to a target ratio;
adjusting, by the application, an amount paid by the employer or an amount paid by the benefit program participant based upon the first cost effectiveness;
comparing a benefit program from one of the plurality of benefit program providers currently provided to benefit program participants to a prospective benefit program under consideration for future provision to the benefit program participants based on the determined cost effectiveness;
comparing internally maintained records for the benefit program participants to records for the benefit program participants maintained by at least some of the benefit program providers; and
generating and displaying, by the application, a report in response to at least one of the adjustment or the determination of the first cost effectiveness, wherein the report comprises the adjustment and an indication of whether the first cost effectiveness is at least one of greater than or less than a predetermined threshold or within the predetermined range, whether the total numbers differ by less than or greater than the benefit program participant variance predetermined threshold, a result of the comparison between the benefit program and the prospective benefit program, and a result of the comparison between the internally maintained records for the benefit program participants and the records for the benefit program participants maintained by at least some of the benefit program providers.

10. The method of claim 9, wherein the plurality of records of payments made by the employer and the plurality of records of payments made by the benefit program participant are associated with at least one benefit program offered by the benefit program provider.

11. The method of claim 9, further comprising analyzing, by the application, a second cost effectiveness of a different plurality of records of payments comprising payments made to another benefit program provider by the employer and a different plurality of records of payments made to the benefit program provider by the benefit program participant.

12. The method of claim 9, further comprising analyzing, by the application, a second cost effectiveness of a plurality of payments associated with a different benefit program offered by the benefit program provider and comprising records of payments made under the different benefit program to the benefit program provider by the employer and a plurality of payments made under the different benefit program to the benefit program provider by the benefit program participant.

13. The method of claim 10, further comprising generating another report comparing the first cost effectiveness to the second cost effectiveness of a plurality of payments comprising payments made to another benefit program provider by the employer and a plurality of payments made to the benefit program provider by the benefit program participant.

14. The method of claim 11, further comprising generating another report comparing the first cost effectiveness and a second cost effectiveness of a plurality of payments associated with a different program offered by the benefit program provider and comprising payments made to the benefit program provider by the employer and a plurality of payments made to the benefit program provider by the benefit program participant.

15. The method of claim 11, further comprising comparing, by the application, a benefit program participant count from the employer and a benefit program participant count from the benefit program provider and sending, by the application, a notification to the employer in response to a determination that the benefit program participant count from the employer and the benefit program participant count from the benefit program provider differ by more than a predetermined threshold.

16. The method of claim 11, wherein the benefit program participant status further comprises a sub-status, wherein the sub-status of a current employee comprises at least one of full time, part time, contract, short or long-term disability, or expatriate, and wherein the sub-state of a former employee comprises at least one of retired, laid off, furloughed, or terminated.

* * * * *